United States Patent [19]

Nygards

[11] 4,113,571
[45] Sep. 12, 1978

[54] WATER DISTILLER OF BOILER-CONDENSER TYPE

[76] Inventor: Nils Nygards, 7435 Hwy. 65 NE, Minneapolis, Minn. 55432

[21] Appl. No.: 661,252

[22] Filed: Feb. 25, 1976

[51] Int. Cl.$^2$ ............................................. B01D 3/02
[52] U.S. Cl. .................................. 202/176; 202/181; 202/185 B; 202/234
[58] Field of Search ................... 202/176, 181, 185 R, 202/185 B, 234, 241; 203/100, 7, 39, 47; 201/2, 19; 159/DIG. 1, 13; 196/121, 122; 219/271, 275, 322, 481; 122/379, 396

[56] References Cited

U.S. PATENT DOCUMENTS

| | | | |
|---|---|---|---|
| 1,325,199 | 12/1919 | Jewell | 202/234 |
| 2,040,837 | 5/1936 | Yarmett | 202/185 |
| 2,470,230 | 5/1949 | Andreasen | 202/185 |
| 2,530,376 | 11/1950 | Castle | 219/275 |
| 2,712,590 | 7/1955 | Doble | 219/481 |
| 2,971,897 | 2/1961 | Chapman | 202/241 |
| 3,291,703 | 12/1966 | Dvonch | 202/185 |
| 3,325,376 | 6/1967 | Eckert | 202/234 |
| 3,408,294 | 10/1968 | Othmer | 159/DIG. 13 |
| 3,665,156 | 5/1972 | Lee | 219/322 |
| 3,930,959 | 1/1976 | Kirschmann | 202/234 |

*Primary Examiner*—Hiram H. Bernstein
*Attorney, Agent, or Firm*—Schroeder, Siegfried, Ryan, Vidas & Steffey

[57] ABSTRACT

A distillation unit for purification of water, to be coupled to a water line or other source of water. The unit consists of a relatively slender boiler with an internal diffuser screen, which is fed water at the same rate as it is removed by the distilling process. The steam from the boiler is led to a detachable condenser, the distillate being collected in a novel collector system, two forms of which are shown.

13 Claims, 3 Drawing Figures

WATER DISTILLER OF BOILER-CONDENSER TYPE

The general object of the invention is to provide a novel water distilling unit which is simple in construction, inexpensive, efficient, and simple and easy to clean.

A more specific object is to provide a novel water distilling unit which has improved efficiency.

Another object is to provide a novel and improved water distilling unit which can be cleaned quickly, simply and easily.

Another object is to provide an improved water distiller which provides for an automatic separation and discharge of volatile gasses which are commonly found in water supply sources.

Another object is to provide an improved water distiller which has each of the above attributes and yet can be quickly and easily disassembled and cleaned.

These and other objects and advantages of my invention will more fully appear from the following description, made in connection with the accompanying drawings, wherein like reference characters refer to the same or similar parts throughout the several views, and in which:

FIG. 3 is an elevational view of an alternative condensing and collection apparatus which may be used in combination with my distilling apparatus.

Figure 1:
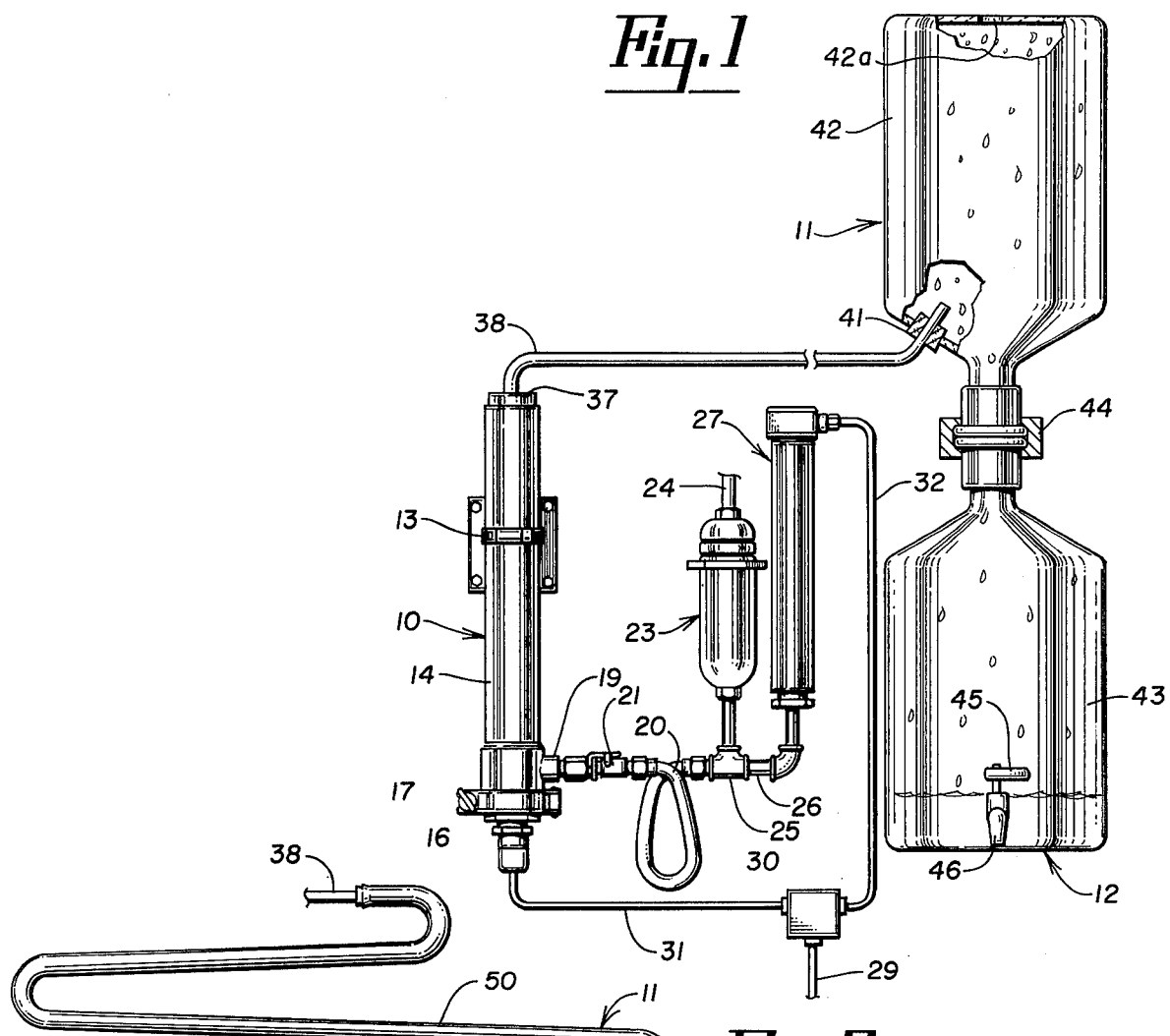
FIG. 1 is an elevational view of the distiller with the condensing and collection apparatus as well as the water feeding elements attached.

Referring to the drawings, this distillation apparatus includes the following three basic components: a boiler 10, a condenser 11, and a collection apparatus 12.

Figure 2:
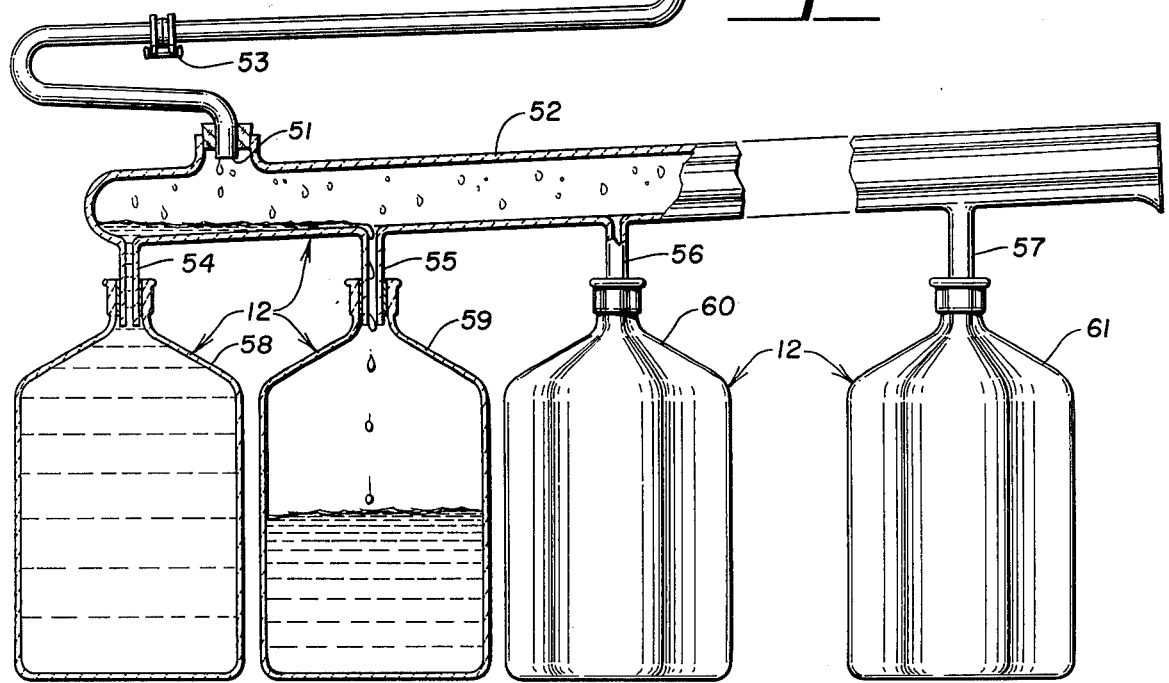
FIG. 2 is a vertical sectional view on an enlarged scale through the water purifier or distillating unit clearly showing the distiller of my invention with the water feeding elements in elevation.
Figure 2:
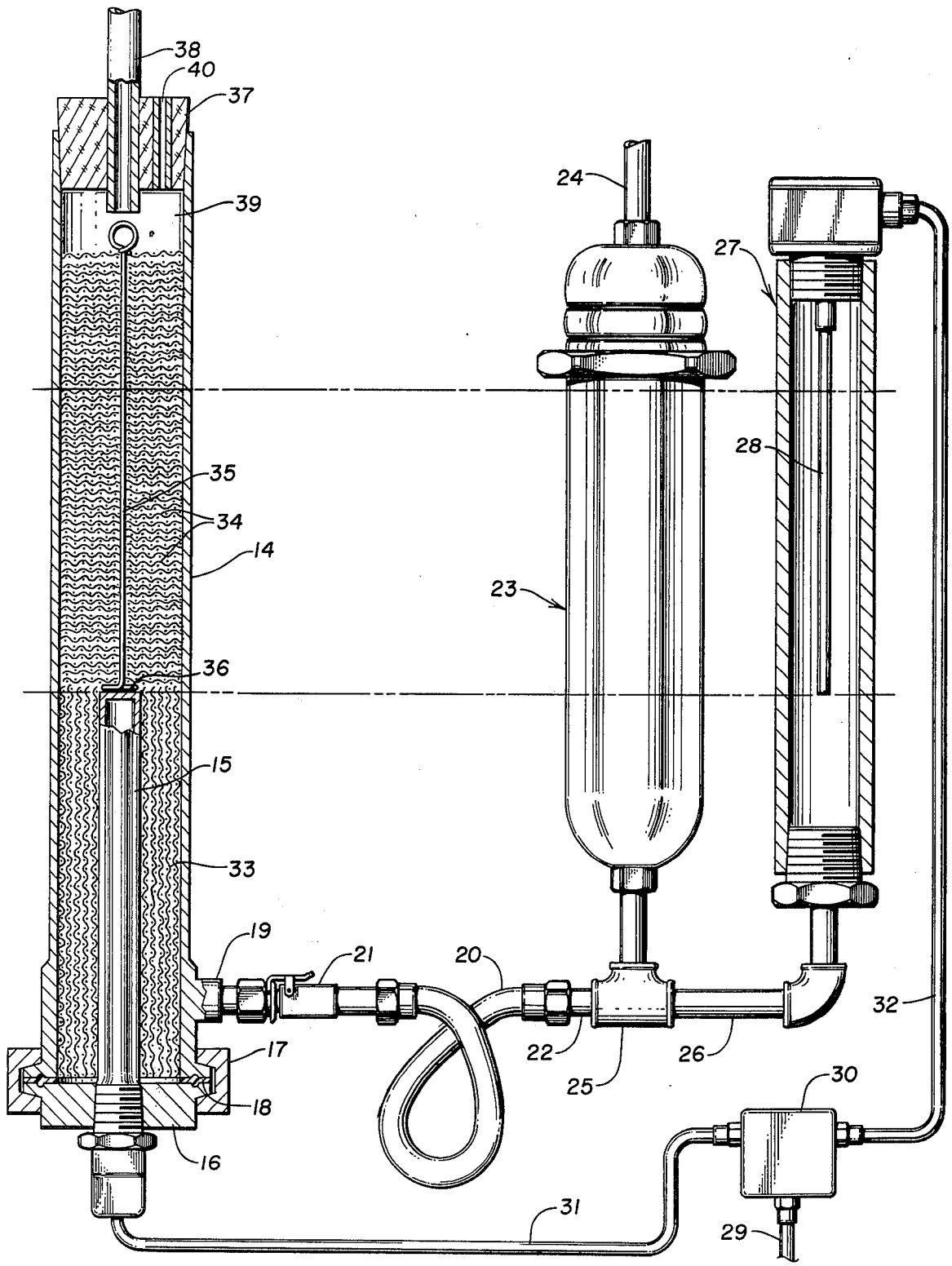

The boiler 10 is supported by clamp means 13 upon any suitable support, such as a wall. It consists of an upright elongated tube 14 within the lower end of which is positioned an upright centrally disposed electric resistance element 15. This resistance element 15 is threaded through a bottom closure element 16 which is secured in place by a simple clamping device 17. A gasket member 18 completes the seal. The resistance element, as shown in FIG. 2, extends upwardly to a distance approaching half the height of the interior of the tube 14.

Water is supplied to the interior of the tube 14 through a nipple carried by the tube adjacent its lower end and by way of a conduit 20 which is supplied with a commonly known coupling 19 and a quick connection Imperial snap-on element 21 which engages the coupling 19 and is connected to the water supply line 22. Each of the coupling 19 and snap-on element 21 has an automatic shut-off. Water is controllably fed to the line 20 by a water feeder readily available on the market and known as a No. 85 Water Boy feeder sold by Maid-O-Mist, Chicago, Illinois 60641 and identified by the numeral 23. Water from a supply not shown is fed to the feeder 23 via a conduit 24.

A T-connection 25 connects the feeder 23 to the conduit 22 and to a conduit 26 which in turn is connected to the lower end of a Warrick electrode fitting 27 available on the market from Charles F. Warrick Co., 1964 West Eleven Mile Road, Berkley, Mich. 48072 and may be ordered as a series 3E1A electrode fitting with a single electrode 28.

An electric current supply (not shown) is connected by an electrical cord 29 to a Warrick Series 2 control 30 which may be ordered as No. 201F1 from the above Charles F. Warrick Co. and which in turn provides electric current to the resistance element 15 via electrical cord 31 and to the electrode fitting 27 via electrical cord 32.

Disposed within the boiler 14 and surrounding the resistance element 15 is a tightly rolled stainless steel screen 33 with a central opening equal to the exterior diameter of the element 15. This stainless steel screen 33 fits snugly around the resistance element 15 and functions to receive lime deposits and to minimize the collection of same on the resistance element 15. Also, the screen 33 holds down the turbulence of the boiling water in the boiler tube 14 and helps to separate the inert gasses from the water vapor as well as to help transfer heat rapidly from the element 15 to the water. A third function of the screen 33 is to facilitate cleaning of the element 15 for when the element 15 is turned relative to the screen 33 before removing same for cleaning, it loosens lime deposits which may have tended to build up upon that element.

It will be noted that the upper end of the roll of screen 33 is disposed only slightly above the upper end of the resistance element 15. Stacked upwardly from that point is a plurality of stainless steel horizontal circular discs 34 having a diameter only slightly less than the interior diameter of the tube 14 and pierced centrally by a wire lift element 35 which carries a horizontally extending loop 36 at its lower end beneath the lowermost disc to facilitate removal of the discs as a unit through the upper end of tube 14. Each of these discs aids in conducting the heat to the water, in receiving lime deposits, in minimizing turbulence in the tube 14, and in separating inert gasses from the water vapor produced by the element 15. The discs 34 also aid in removing any lime deposits which may tend to accumulate upon the inside wall of the upper portion of the tube 14.

The upper end of tube 14 is fitted with a cork 37. Through the center of the cork 37 is inserted a glass tube 38, the lower end of which extends below the lower end of the cork to form a volatile gas pocket 39 in the area between the lower end of the tube 38 and the lower end of the cork. A small outlet tube 40 leads to the atmosphere to facilitate escape of said gasses. The cork 37 is a friction fit and also serves as a relief valve in the event steam outlet tube 38 should inadvertently become plugged.

The tube 38, as shown in FIG. 1, extends through a cork 41 and terminates within a condenser chamber 42 which may be, as shown, in the form of an inverted glass bottle of substantial size. This tube 38 may be supported in any conventional manner by any suitable means (not shown). The tube 38 extends through the cork 41 into the interior of the chamber, an opening in the bottle 42 being provided for that purpose. A small opening 42a is provided in the bottom of the bottle 42 to avoid undue pressure from ever building up. The condenser chamber 42 is supported by its neck portion by a collector chamber 43 and is in fluid communication therewith to cause the condensed water vapor to be collected by the latter as it falls from the chamber. A clamp 44 secures the two mouth portions of the bottles 42 and 43 together. A valve member 45 and discharge spout 46 facilitate withdrawal of the distilled water from the collector chamber 43 which, as shown, may be in the form of a bottle which is upright. Each form of condenser shown herein obviously is cooled by the air surrounding it, the ambient temperature of the conventional room being substantially lower than the gases driven off by evaporation. This, plus the expansion of such gases as they are introduced into the condensers, causes condensation as is well recognized in the art.

A second form of condenser 11 and collector apparatus 12 is shown in FIG. 3 connected to tube 38. It includes glass piping 50 which is reversed upon itself and has a terminal portion 51 which leads downwardly into the lower end portion of condenser chamber or tube 52 which extends slightly upwardly therefrom as shown. The tube 50, like tube 38, may be supported in any suitable manner. Disposed within the tube 50 is a clamp connection 53 which facilitates disconnection and swinging away of the terminal portion of tube 50.

The collector tube 52 is closed at its lower end and has a plurality of discharge outlet tubes 54, 55, 56 and 57, the latter three of which is each slightly elevated relative to the adjacent outlet tube nearer to the lowest outlet tube 54. Disposed beneath each of these outlet tubes is one of four glass bottles 58, 59, 60 and 61. Each of the outlet tubes 54, 55, 56 and 57 extends into its associated bottle 58, 59, 60 and 61, respectively, through a tight fitting cork so that when the first bottle 58 is filled, the distilled water collects at the lower end of tube 52 until its volume is sufficient to cause the additionally condensed water to enter bottle 59 through outlet 55. When bottle 59 has been filled, the water will accumulate in tube 52 until flow commences into bottle 60. When bottle 60 is filled, the water will flow into bottle 61.

I have found that my water distiller provides a number of distinct advantages. The wire roll 33 and the discs 34 minimize turbulence and facilitate heating of the water with increased evaporation and minimal turbulence resulting. Most of the lime deposits from the water affix to the screen so that a minimum of same accrues on the resistance element 15. Since lime deposits on a heating element decrease the efficiency thereof, my distiller operates more efficiently. If desired, two screen rolls, such as roll 33, may be utilized, so that one may be soaked in vinegar to remove the lime deposits while the other is being utilized in distillation, thereby accomplishing the cleaning operation with no effort to delay whatsoever. Similarly, a substitute disc assembly similar to discs 34 and lift member 35 may be utilized while the other is oaked in vinegar.

When it is desired to clean the interior of tube 14, this can be readily accomplished by disconnecting snap coupling 21, clearing the water from the tube, and then filling tube 14 with strong vinegar and permitting same to stand for 30 to 60 minutes. The strong vinegar will absorb any lime deposits found in the interior thereof. Moreover, when the screen roll 33 is rotated within tube 14 after the tube 14 has been emptied and clamp 17 and element 15 have been removed, the screen roll 33 will loosen any remaining deposits clinging to the lower interior walls of the tube 14. Likewise, the screen discs 35 will accomplish the same function for the upper portions of the tube 14 when they are lifted out of the tube by pulling upwardly upon lift 15 after removing cork 37.

To facilitate cleaning of the resistance element 15, the latter may be merely rotated about its longitudinal axis prior to withdrawal thereof from the screen roll 33 and tube 14. Upon so doing, the screen roll 33 will loosen any lime deposits which may have accumulated upon the exterior of that element.

It will be noted that the water feeder 23 is designed to maintain the water level within the boiler tube 14 at a level about 1½ inches above the heating element 15, as shown, but no higher. The volatile and lighter gasses are driven off and collect in the area 39 and escape through the opening 40 while the water vapor passes upwardly through the tube 38 into the condenser chamber 42 or into tubing 50, as the case may be.

The electrode fitting 27 is provided to preclude the possibility of burning out the heating element 15 in the event of failure of an adequate supply of water to reach tube 14. So long as the supply of water is adequate, the lower end of electrode 28 will be covered with water and current will be transmitted to element 15 through electrical cord 31. However, as soon as the water level falls below the upper end of element 15, the lower end of electrode 28 (which is at the same elevation) will be uncovered and the circuit to cord 31 will be broken by Warrick control 30 and the electrical circuit to element 15 will be cut off, thereby preventing it from burning out.

The advantage of the water distilling, condensing and collection systems shown herein are readily apparent. In addition to the distinct advantages of the boiler tube construction, the condensing and collection systems provide a safe and efficient means of condensing and collecting the distilled water in suitable glass containers. Moreover, the collector system in FIG. 3 shows a system wherein a number of bottles may be filled without attending the same, the number being limited only by the number of outlets provided on the tube 52 and their associated bottles, only the last of which needs to remain open.

It will, of course, be understood that various changes may be made in the form, details, arrangement and proportions of the parts without departing from the scope of my invention which consists of the matter shown and described herein and set forth in the appended claims.

What I claim is:

1. A water distiller comprising an upright elongated boiler tube, an electric heating member extending upwardly within said tube, means for connecting said member with a source of electric current for heating the same, a wire screen heat transmitter surrounding said member in close fitting relation to transfer heat rapidly therefrom and transmit same to surrounding water and to minimize turbulence in such water as distillation proceeds, means for introducing water into said tube to maintain a supply thereof therewithin around said screen and heating member as distillation proceeds, and means connected with said boiler tube and receiving water vapor therefrom for condensing and for collecting same.

2. The structure defined in claim 1, wherein said wire screen is arranged in a tightly wound roll surrounding said heating member.

3. The structure defined in claim 1, wherein said wire screen is arranged in a roll snugly surrounding said heating member and filling the interior of said tube around said heating member.

4. The structure defined in claim 1, wherein said wire screen is arranged in a roll snugly surrounding said heating member, and a plurality of horizontal wire screen discs stacked above said heating member within said tube and filling at least a major part of the upper portion thereof.

5. The structure defined in claim 4, and means extending axially through said discs and securing the same together to facilitate removal thereof from said tube, the diameter of said discs approximating the interior diameter of the upper portions of said tube.

6. The structure defined in claim 1, wherein said heating member is an elongated cylinder.

7. The structure defined in claim 1, wherein said screen is wound into a roll which fits tightly around said heating member and extends upward to a point adjacent the upper end thereof.

8. The structure defined in claim 1, wherein said means for introducing water into said tube functions automatically to maintain the water within said boiler tube at the desired level.

9. The structure defined in claim 1 wherein said means for condensing the water vapor and for collecting same is comprised of a collection container having an opening at its upper end to receive the distilled water therethrough, and a condensation chamber structure comprised of an inverted bottle-like member supported by said collection container and having its neck disposed in communicating relation with said collection container opening, said bottle-like member being connected at a point adjacent its neck portion with said boiler tube in water vapor receiving relation.

10. A water distiller comprising an upright elongated boiler tube adapted to contain water therein, an electric heating member extending upwardly within said tube, means carried by said member for connecting the same with a source of electric current for heating said member, metal heat dispersing means engaging and surrounding said heating member and including heat conducting portions of relatively small diameter which readily transmit heat from said member to the water surrounding the same for distillation thereof and to minimize turbulence in such water, means for introducing water into said tube to maintain a supply thereof therewithin around said portions and said heating member as distillation proceeds, and means connected with the upper portions of said boiler tube and receiving water vapor therefrom for condensing and collecting the same.

11. The structure defined in claim 10 wherein said metal heat dispersing means has a large number of said heat conducting portions of relatively small diameter.

12. The structure defined in claim 10 wherein said electric heating member extends axially and centrally of said tube and said heat dispersing means has a large number of said heat conducting portions of relatively small diameter disposed radially outwardly of said heating member.

13. The structure defined in claim 10 wherein said heat dispersing means has a large number of said heat conducting portions of relatively small diameter disposed radially outwardly of said heating member and in close proximity to each other.

* * * * *